United States Patent [19]

English

[11] 3,976,515

[45] Aug. 24, 1976

[54] LOW-FUMING FLUXES

[75] Inventor: Daniel R. English, San Carlos, Calif.

[73] Assignee: E. I. Du Pont de Nemours and Company, Wilmington, Del.

[22] Filed: Aug. 27, 1973

[21] Appl. No.: 391,527

[52] U.S. Cl. ................................. 148/26; 148/23; 148/24; 148/25; 427/433
[51] Int. Cl.² ..................................... B23K 35/365
[58] Field of Search ................ 148/23, 24, 25, 26; 117/52; 75/94; 423/470, 471; 252/193

[56] References Cited
UNITED STATES PATENTS

| | | | |
|---|---|---|---|
| 800,807 | 10/1905 | Larsen | 148/25 |
| 2,662,840 | 12/1953 | Shilling et al. | 148/23 |
| 3,008,230 | 11/1961 | Babcock et al. | 148/26 X |
| 3,259,973 | 7/1966 | Quaas et al. | 148/26 X |
| 3,380,862 | 4/1968 | O'Brien | 148/23 |
| 3,796,611 | 3/1974 | O'Brien | 148/23 |
| 3,814,637 | 6/1974 | Scott | 148/26 X |

FOREIGN PATENTS OR APPLICATIONS

| | | | |
|---|---|---|---|
| 2,229 | 6/1932 | Australia | 148/24 |
| 733,816 | 7/1955 | United Kingdom | 148/24 |

*Primary Examiner*—Allen B. Curtis
*Assistant Examiner*—Thomas A. Waltz

[57] ABSTRACT

Low-fuming fluxes are provided which contain up to about 18% by weight of a dust-free large-particle source of ammonium chloride.

10 Claims, No Drawings

LOW-FUMING FLUXES

BACKGROUND OF THE INVENTION

Those industries which are engaged in activities such as galvanizing, hot-tinning, terne coating, can seam sealing and so on, require the use of flux compositions to aid in the effective cleaning and wetting of the surface to be treated and to obviate the formation of deleterious oxides on the surface of the glavanizing and the like baths which are to be used.

In order to be effective, such fluxes whether top flux or preflux compositions, must have a high degree of chemical activity. This activity is provided by ammonium chloride which is generally present in commercial fluxes at concentrations of 10% by weight or more. Unfortunately, when such quantities of ammonium chloride are used, a high degree of fuming occurs from the flux composition and anti-pollution standards are sometimes violated.

Compromise formulations have been proposed in which the ammonium chloride level is maintained at about 3% by weight to give acceptable fume control and yet allow a measure of oxide-dissolving chemical activity. In fact, however, it has been found that fluxes containing 3% of ammonium chloride are no more effective than those which contain 1% of ammonium chloride while the fluxes containing 3% show a detectable increase in fume evolution.

Other alternatives have been proposed to deal with the problem of adequate chemical activity and low fuming. For example, galvanizing fluxes in which a fluoride salt is employed have been disclosed in U.S. Pat. No. 3,244,551, issued to Sidney M. Heins on April 5, 1966. Low-fuming fluxes have been proposed in which various frothing agents are employed, such as, for example, in U.S. Pat. No. 2,940,870, issued to Allen T. Baldwin on June 14, 1960 and U.S. Pat. No. 2,473,580, issued to Lowell D. Eubank et al. on June 21, 1949. Notwithstanding these suggestions of the prior art, fluxes which are low fuming by virtue of a low concentration of ammonium chloride have been less than highly effective, particularly as measured by commercial standards.

SUMMARY OF THE INVENTION

It is now possible to prepare low-fuming galvanizing fluxes substantially devoid of prior art disadvantages, even when the fluxes contain ammonium chloride at concentrations in excess of 3% by weight of the flux composition, when a dust-free, large-particle source of ammonium chloride is used. Generally, at least 90% by weight of the ammonium chloride source material has a size of U.S. Standard Screen −2 mesh, +8 mesh.

DETAILED DESCRIPTION OF THE INVENTION

The ammonium chloride of this invention can be used in any desired top flux or preflux composition generally employed in galvanizing, hot-tinning, terne coating, can seam sealing, and the like. Some such suitable compositions are disclosed in Dutch Published Application No. 6,701,575 and any of the patents cited hereinbefore. It is to be understood that when the ammonium chloride source material of this invention is used, any flux composition which can be activated with ammonium chloride may be employed with highly advantageous result and low fuming. While factors such as the density, thickness and bubble size (i.e., insulation efficiency) of the foam flux blanket as well as the degree of foaming and temperature of the bath influence the degree of fuming, nevertheless, these factors being equal, the degree of fuming obtained when the ammonium chloride source material of this invention is used is surprisingly reduced over that obtained using conventional ammonium chloride fines. Thus, the flux composition to be activated is generally not critical in the practice of the invention.

At least 90% by weight of the large-volume ammonium chloride containing masses or particles which are to be used in this invention must have a U.S. Standard Screen Size of −2 mesh, +8 mesh. This contrasts to the fines grades currently being employed, approximately 97% of which pass through a U.S.S. Screen Number 20. While one may use particles of a larger dimension than those specified herein, the use of excessively large particles of relatively pure ammonium chloride would cause high local concentrations of dissolved ammonium chloride and, thus, high fume evolution. Thus, it is preferred that a source material containing ammonium chloride in a diluted form is used in such cases. For example, compositions formed by blending ammonium chloride with zinc chloride or zinc ammonium chloride or mixtures thereof and pelletizing may be used which contain, for example, 45%, 55%, 70% by weight and so on of ammonium chloride based on the weight of the pelletized composition.

The use of fines or particles of a smaller dimension than those specified herein results in extremely high fume evolution, particularly when the finely divided, low-melting particles quickly melt during the formation of a foamed liquid flux blanket. The natural tendency of the ammonium chloride to sublime or to yield decomposition products which in turn sublime results in thick, white, noxious, polluting fumes.

When the specific large-particle-size ammonium chloride source material of this invention is used, on the other hand, the flux composition can contain up to about 18% by weight of ammonium chloride without violating the acceptable level of fume evolution as based on visual evaluation using the Ringelman standard on strand wire and strip lines which are generally continuous. For overall general applications, concentrations of up to about 14% by weight of the flux composition, and generally from about 3% about 14%, preferably 6% to 10% will yield the desired results. It is most preferred to use concentrations of 6 to 8% for hot dipping. Hence, fluxing performance is improved significantly, larger amounts of ammonium chloride may be used as desired, and a Ringelman 1 standard can be observed, even at the point of emission (as opposed to measurements taken at the exhaust stacks), when the ammonium chloride described herein is employed.

The Ringelman standards have been set up by Air Pollution Control Boards and are based on visual observation and estimation of fume opacity. The rating is based on a scale of 1–5 and is measured either at the point of fume emission or at the exhaust stacks. Ringleman 1 or 20% opacity at the stacks is in most locations acceptable standard for industrial emission at the stacks. Prior art flux compositions employing standard ammonium chloride fines at concentrations of 10% generally have been hard pressed to meet even a Ringelman 3 or 60% opacity standard at the stacks. Such fluxes containing only 3% of ammonium chloride are hard pressed to meet a Ringelman 3 or 60% opacity standard at the point of emission.

The advantageous results of this invention are achieved in a unique and most unexpected manner. The most objectionable period of fume evolution occurs when the flux salt is melting down to form a flux blanket. The large-size, slow-melting ammonium chloride particles of this invention are less likely to dissolve into the liquid flux composition and exceed the gaseous solubility of the ammonium chloride in the system. Nevertheless, a sufficient quantity of the ammonium chloride dissolves at the outset to generate the chemical activity at the surface and slightly below the surface of the flux which is necessary to provide the required cleaning and wetting action and to yield a blanket of foam on the surface of the bath by which the formation of unwanted oxides on the surface of the bath is prevented.

The second most objectionable occasion of fume evolution occurs when the foamed flux blanket is disturbed, increasing the exposure of uninsulated high temperature bath surface to the atmosphere. In the instant case, the comparatively low total dissolved quantity of ammonium chloride and the excellent thermal insulating properties of the foam blanket result in only limited overheating and minimal ammonium chloride volatilization.

The ammonium chloride of this invention may be added to the desired flux composition by simply introducing it to an already prepared commercial flux composition which is low in ammonium chloride or else it may be used in the initial preparation of the flux. No matter how the flux composition may be varied, it will operate efficiently and effectively in accordance with this invention without the noxious fumes that had heretofore attended the use of flux compositions containing more than about 3% of ammonium chloride as the chemical activating agent.

The fluxes of this invention are advantageously employed whether the bath metal is zinc, as in conventional galavanizing, a zinc alloy or even an alloy such as Sn-Pb which is used in terne coating. In addition, articles of any desired shape can be coated with the bath metal using the fluxes of this invention as discussed, for example, in *Hot-Dip Galvanizing Practice*, William H. Spowers, Jr., The Penton Publishing Company, Cleveland, Ohio, 1938, pages 32–70. The instant fluxes are most advantageous for the coating of ferrous and tin articles.

The invention is further illustrated but is not intended to be limited by the following examples in which all parts and percentages are by weight, unless otherwise indicated.

EXAMPLE 1

A commercial low fuming flux containing about 66% of zinc chloride, about 20% of sodium chloride, about 13% of potassium chloride and about 1% of conventional ammonium chloride, about 97% of which passes through U.S.S. Screen Number 20 is placed on the surface of molten zinc maintained at a temperature of 455°C. in sufficient quantity to yield a 2.5 inch thick foam blanket on the zinc surface in a commercial galvanizing line utilizing a tank approximately 35 feet long, 5 feet wide and 6 feet deep. All Ringelman measurements were taken at the point of emission. On melt down to form a two and one half inch blanket of foam the flux fumes slightly (less than Ringelman 1). While the bath is static, little or no fume evolution occurs. Under working conditions of sheet plate introduction and withdrawal, only slight fuming takes place (less than Ringelman 1).

EXAMPLE 2

The flux of Example 1 is used except that the flux contains 3% of conventional ammonium chloride. On melt down, excessive fuming takes place (approximately Ringelman 3). While the bath is static, only slight fume evolution occurs from the flux blanket (approximately Ringelman 1). Under working conditions of sheet plate introduction and withdrawal, moderate fuming takes place (approximately Ringelman 1).

EXAMPLE 3

The flux of Example 1, is used except that the flux contains 5% of dust-free, large particle size ammonium chloride, at least 90% of which passes through U.S.S. Screen Number 2 and fails to pass through a U.S.S. Screen Number 8. On melt down only slight fuming occurs (approximately Ringelman 1). While the bath is static, only slight fume evolution takes place from the flux blanket (less than Ringelman 1). Under working conditions of sheet plate introduction and withdrawal, only slight fuming occurs (less than Ringelman 1).

EXAMPLE 4

The flux of Example 1 is used except that the flux contains 10% of dust-free, large particle size ammonium chloride, at least 90% of which passes through a U.S.S. Screen Number 2 and fails to pass through a U.S.S. Screen Number 8. On melt down, only slight fuming occurs (approximately Ringelman 1). While the bath is static, only slight fume evolution takes place from the flux blanket (less than Ringelman 1). Under working conditions of sheet plate introduction and withdrawal, only slight fuming occurs (less than Ringelman 1).

Thus, the results show surprisingly enough that a flux composition having a 500% and 1,000% increase in ammonium chloride content can produce little or only slight fume evolution and satisfy the standards set for acceptable fuming under the environmental protection codes, even when the fuming is measured at the point of emission. In addition, the foamed top flux blanket of Examples 3 and 4 was more fluid and of better texture since the bubbles were small and long lasting; accordingly, the foam blanket held up better and could be used over a longer period. The total fume evolution throughout the working life of the flux was under better control due to the improved condition of the foam blanket. Improved flux release from the glavanized work was obtained due to the added chemical activity and lower viscosity of the flux blanket. In addition, improved wetting was obtained as measured in a commercial galvanizing operation during a 3 day trial as demonstrated by the fact that fewer uncoated areas which required redipping to achieve satisfactory yields were observed.

EXAMPLE 5

Example 1 is repeated except that the flux contains 8% of conventional ammonium chloride. On melt down, excessive fuming occurs (approximately Ringelman 4). While the bath is static, the fuming decreases to approximately Ringelman 2. Under working conditions of sheet plate introduction and withdrawal, excessive fuming again takes place (approximately Ringelman 4).

EXAMPLE 6

The flux of Example 2 is used except that the flux contains about 14% of dust-free, large particle size ammonium chloride, at least 90% of which passes through U.S.S. Screen Number 2 and fails to pass through a U.S.S. Screen Number 8. On melt down, only slight fuming occurs (slightly higher than Ringelman 1). While the bath is static, only slight fume evolution takes place from the flux blanket (slightly less than Ringelman 1). Under working conditions of sheet plate introduction and withdrawal, only slight fuming occurs (approximately Ringelman 1).

EXAMPLE 7

The flux of Example 2 is used except that the flux contains about 20% of a dust-free, large particle size zinc ammonium chloride salt containing about 70 % of ammonium chloride. At least 90% of the zinc ammonium chloride particles pass through a U.S.S. Screen Number 2 and fails to pass through a U.S.S. Screen Number 8. On melt down, only slight fuming occurs (slightly less than Ringelman 1). while the bath is static, only slight fume evolution takes place from the flux blanket (less than Ringelman 1). Under working conditions of sheet plate introduction and withdrawal, only slight fuming occurs (Ringelman 1).

Although the invention has been described in considerable detail in the foregoing, such detail is solely for the purpose of illustration. Variations can be made in the invention by those skilled in the art without departing from the spirit and scope of the invention except as set forth in the claims.

What is claimed is:

1. In a flux composition used in galvanizing, hot-tinning, terne coating and can seam sealing and activated by ammonium chloride the improvement wherein a total ammonium chloride content of from 3 to about 18% by weight of the flux composition is present in the flux composition and said ammonium chloride has at least 90% by weight of the particles of the size of U.S.S. Screen of −2 mesh to +8 mesh.

2. The flux of claim 1 wherein the source of the ammonium chloride is a compound selected from ammonium chloride, zinc ammonium chloride and mixtures thereof.

3. The flux of claim 1 which contains from about 3% to about 14% by weight of ammonium chloride.

4. The flux of claim 1 which contains about 6 to 10% by weight of ammonium chloride.

5. The flux of claim 1 which contains about 6 to 8% by weight of ammonium chloride.

6. The flux of claim 1 in which the ammonium chloride source is a blend of ammonium chloride and zinc chloride or zinc ammonium chloride.

7. The flux of claim 6 in which the ammonium chloride source contains 45%, 55% or 70% by weight of ammonium chloride.

8. The flux of claim 1 wherein the ammonium chloride source is zinc ammonium chloride.

9. In a process for galvanizing an article by passing the article through a molten flux composition and into a bath of zinc, the improvement which comprises passing the article through the flux of claim 1.

10. The process of claim 9 wherein the flux of claim 5 is used.

* * * * *